J. M. WILTSIE.
Fertilizer.

No. 46,515.

Patented Feb. 21, 1865.

Witnesses
Ira Loughborough
Asa H. Billings

Inventor.
J. M. Wiltsie
By his Atty Wm S. Loughborough

UNITED STATES PATENT OFFICE.

J. M. WILTSIE, OF PITTSFORD, NEW YORK.

APPARATUS FOR DISTRIBUTING FERTILIZERS.

Specification forming part of Letters Patent No. 46,515, dated February 21, 1865.

*To all whom it may concern:*

Be it known that I, J. M. WILTSIE, of Pittsford, in the county of Monroe and State of New York, have invented certain new and useful improvements in lime and ash distributers to be used by hand; and I do hereby declare that the following is a full, clear, and exact description thereof, reference being had to the accompanying drawings, making a part of this specification, in which—

Figure 1:
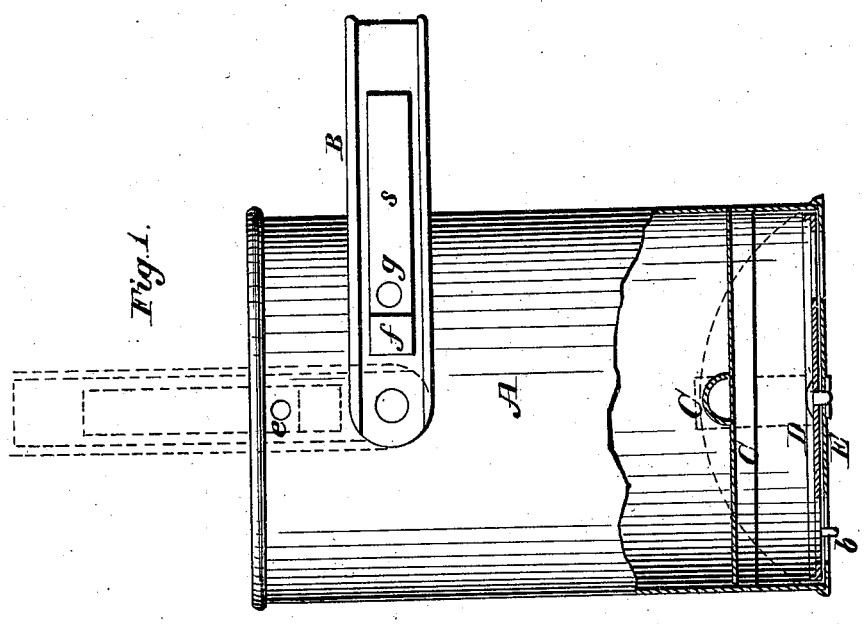
Figure 2:
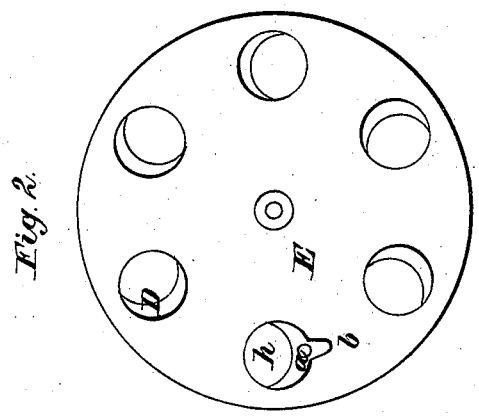

Figure 1 is a side elevation of the implement, and showing a central section of the lower portion. Fig. 2 is a plan of the bottom, showing the adjustable disk or register D so set as to partially close the orifices $h$.

Similar letters of reference indicate corresponding parts in both figures.

This invention relates to that class of fertilizer-spreaders which are used by hand on hill-crops; and it consists in the employment of one or more pulverizing-bars placed near the bottom of the chamber, where they also act as arresters to prevent the lime, &c., from becoming packed upon the bottom, which has heretofore caused much inconvenience.

It also consists in providing a self-locking bail, which may be swung down either way, so as to afford free access to the mouth of the vessel for filling, &c. It also further consists in placing the false bottom or register-plate within the vessel, whereby it is entirely protected from derangement and from getting bent and bruised.

To enable others to work my invention, I will describe its construction and application.

I use the vessel ordinarily employed for this purpose, but place the register D above the fixed bottom E, and attach to it an adjusting pivot or spur, $a$, which is made to project through one of the openings $h$ of the outer head, E. The spur $a$ is attached to the head near the edge of one of the holes $h$, and there is a notch, $b$, from the head E to receive it when the register is fully opened, and when it is closed the spur strikes the other side of the hole, which constitutes a stop on that side. This is a great convenience, both in giving a full opening and in closing it. Besides, by placing the register inside it is much less liable to derangement while in use or to have the gage changed.

The pulverizers C may be made of wood, half-round, and secured in position by nails driven through the case; or they may be made of corrugated metal and soldered to the case. If two are used, they may be crossed, as shown in Fig. 1; or there may be two strips crossed, riveted together in the center, and applied as indicated by the red lines in Fig. 1. The object of these bars is twofold: they act as a pulverizer of the ashes, &c., and they also prevent them from packing upon the bottom, which, without them, frequently becomes so solid as to entirely prevent their discharge.

I pivot the bail B to the vessel some distance from the top, as shown in Fig. 1, and provide it with a spring-catch, $s$, the spur $g$ of which registers to the hole $e$ when the bail is placed in its upright position, as indicated by the dotted lines. The spur may be withdrawn by pulling the ring $f$. This arrangement affords all the advantages of a swinging bail, and also of a tight one, the latter being absolutely necessary in the manipulation of these instruments, that their direction may be controlled while they are being shaken over the hill.

What I claim as my invention, and desire to secure by Letters Patent, is—

1. The swinging self-locking bail or handle B, applied and operated in the manner and for the purposes specified.

2. The application of the bars C in distributers for lime and other fine fertilizers, to be used by hand, as shown, and for the purposes set forth.

3. Arranging the register-plate D within the case, as shown, and for the purposes described.

JAMES M. WILTSIE.

Witnesses:
IRA LOUGHBOROUGH,
JOHN McGILL.